(12) United States Patent
Dun et al.

(10) Patent No.: US 10,048,061 B2
(45) Date of Patent: Aug. 14, 2018

(54) MEASURING METHOD AND MEASURING SYSTEM THEREOF

(71) Applicant: BOE TECHNOLOGY GROUP CO., LTD., Beijing (CN)

(72) Inventors: Shengbao Dun, Beijing (CN); Zhongbao Wu, Beijing (CN); Li Sun, Beijing (CN); Hangman Lai, Beijing (CN); Yan Wei, Beijing (CN); Zhiying Zhang, Beijing (CN); Weili Zhao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 15/516,734

(22) PCT Filed: May 11, 2016

(86) PCT No.: PCT/CN2016/081634
§ 371 (c)(1),
(2) Date: Apr. 4, 2017

(87) PCT Pub. No.: WO2017/133113
PCT Pub. Date: Aug. 10, 2017

(65) Prior Publication Data
US 2017/0328703 A1    Nov. 16, 2017

(30) Foreign Application Priority Data
Feb. 1, 2016   (CN) .......................... 2016 1 0069779

(51) Int. Cl.
*G01B 11/14*    (2006.01)
*G01J 1/42*     (2006.01)
(Continued)

(52) U.S. Cl.
CPC ............... *G01B 11/14* (2013.01); *G01J 1/42* (2013.01); *G01J 3/506* (2013.01);
(Continued)

(58) Field of Classification Search
CPC ............. G09G 3/006; G09G 2320/066; H04N 13/0425; H04N 1/6027; H04N 1/6033; H04N 1/6044
See application file for complete search history.

(56) References Cited

U.S. PATENT DOCUMENTS 5,220,496 A * 6/1993 Tanaka ..................... H04N 9/73
                                                   348/E9.051
7,791,652 B2    9/2010 Mitsunaga
(Continued)

FOREIGN PATENT DOCUMENTS

CN    101090458 A    12/2007
CN    102469343 A     5/2012
(Continued)

OTHER PUBLICATIONS

"Constant APL Test Patterns—A Report on Display Gamma Measurements" Joel Barsotti, Tom Schulte. Sep. 7, 2015. Accessed via the Wayback Machine on Oct. 30, 2017. https://web.archive.org/web/20150907215256/http://www.spectracal.com/Documents/White%20Papers/Constant%20APL%20Test%20Patterns.pdf.*
(Continued)

*Primary Examiner* — Antonio A Caschera
(74) *Attorney, Agent, or Firm* — Collard & Roe, P.C.

(57) ABSTRACT

A measuring method and a measuring system are used for measuring contrast of a display device, including controlling the display device to display a first image, measuring brightness of a central area of the first image, controlling display device to display a second image, measuring brightness of a central area of the second image, and determining
(Continued)

the contrast. Both the first image and the second image have a plurality of areas with different gray scales, the first image includes a maximum gray scale area, and the second image includes a minimum gray scale area.

20 Claims, 5 Drawing Sheets

(51) Int. Cl.
- *G02B 27/22* (2018.01)
- *G09G 3/00* (2006.01)
- *H04N 13/04* (2006.01)
- *G01J 3/50* (2006.01)

(52) U.S. Cl.
CPC ......... *G02B 27/2228* (2013.01); *G09G 3/006* (2013.01); *H04N 13/0425* (2013.01)

(56) References Cited

U.S. PATENT DOCUMENTS

| | | | |
|---|---|---|---|
| 8,861,835 B2 | 10/2014 | Kim et al. | |
| 2003/0234785 A1* | 12/2003 | Matsuda | H04N 5/74 345/426 |
| 2016/0282186 A1 | 9/2016 | Zhang | |

FOREIGN PATENT DOCUMENTS

| | | |
|---|---|---|
| CN | 202916071 U | 5/2013 |
| CN | 104296971 A | 1/2015 |
| CN | 104680962 A | 6/2015 |
| JP | 2010-261849 A | 11/2010 |

OTHER PUBLICATIONS

"AVSHD 709—Patterns Manual" Nov. 30, 2010. Accessed via the Wayback Machine on Oct. 30, 2017. https://web.archive.org/web/20101214103440/http://www.w6rz.net/avshd709/Patterns-Manual.pdf.*

International Search Report of PCT/CN2016/081634 in Chinese, dated Oct. 28, 2016 with English translation.

Notice of Transmittal of the International Search Report of PCT/CN2016/081634 in Chinese, dated Oct. 28, 2016.

Written Opinion of the International Searching Authority of PCT/CN2016/081634 in Chinese, dated Oct. 28, 2016 with English translation.

\* cited by examiner

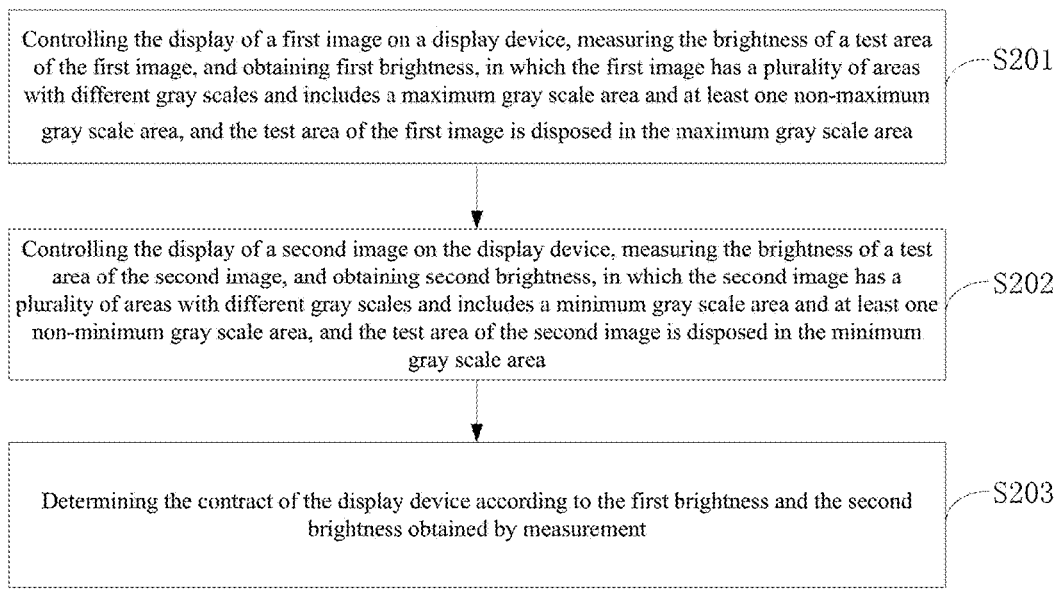

S201 Controlling the display of a first image on a display device, measuring the brightness of a test area of the first image, and obtaining first brightness, in which the first image has a plurality of areas with different gray scales and includes a maximum gray scale area and at least one non-maximum gray scale area, and the test area of the first image is disposed in the maximum gray scale area S202 Controlling the display of a second image on the display device, measuring the brightness of a test area of the second image, and obtaining second brightness, in which the second image has a plurality of areas with different gray scales and includes a minimum gray scale area and at least one non-minimum gray scale area, and the test area of the second image is disposed in the minimum gray scale area S203 Determining the contract of the display device according to the first brightness and the second brightness obtained by measurement

FIG. 2

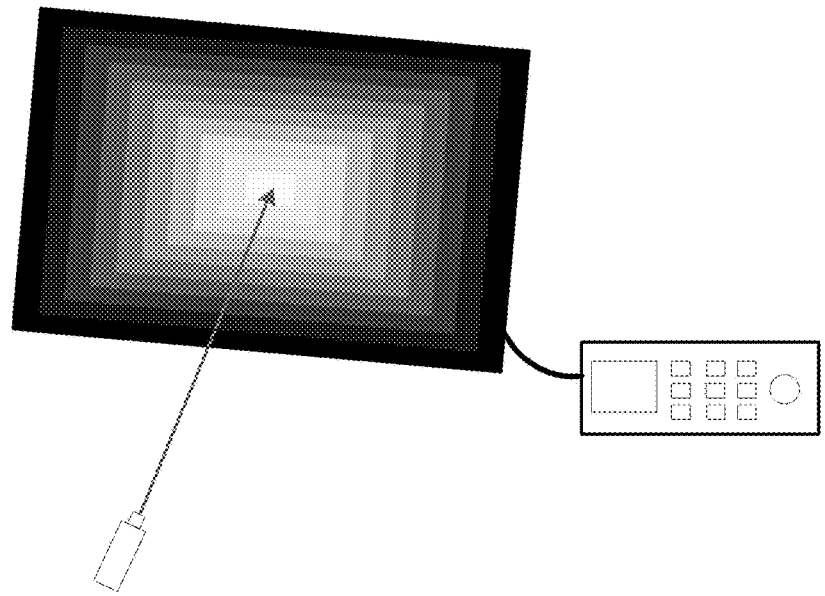

FIG. 3a

MEASURING METHOD AND MEASURING SYSTEM THEREOF

CROSS REFERENCE TO RELATED APPLICATIONS

This application is the National Stage of PCT/CN2016/081634 filed on May 11, 2016, which claims priority under 35 U.S.C. § 119 of Chinese Application No. 201610069779.1 filed on Jan. 2, 2016, the disclosure of which is incorporated by reference.

TECHNICAL FIELD

The present invention relates to a measuring method and a measuring system thereof.

BACKGROUND

Contrast is an important optical characteristic of display device and has a critical impact on the visual effect. In general, when the contrast is higher, an image is clearer and the color is more vivid; and when the contrast is lower, the image is more blurred. The detection of contrast is very important to the quality control of the display device.

SUMMARY

An embodiment of the disclosure provides a measuring method for measuring contrast of a display device, comprising: controlling the display device to display a first image, measuring brightness of a central area of the first image, and obtaining a first brightness, wherein the first image includes a maximum gray scale area and at least one non-maximum gray scale area, and a test area of the first image is disposed in the maximum gray scale area; controlling the display device to display a second image, measuring brightness of a central area of the second image, and obtaining a second brightness, wherein the second image includes a minimum gray scale area and at least one non-minimum gray scale area, and a test area of the second image is disposed in the minimum gray scale area; and determining the contrast of the display device according to the first brightness and the second brightness.

Another embodiment of the disclosure provides a measuring system for measuring contrast of a display device, comprising: a first processing unit configured to control a display device to display a first image, measure brightness of a central area of the first image, and obtain a first brightness, wherein the first image has a plurality of areas with different gray scales; the gray scale of the central area of the first image is maximum; and the display device has a single channel of n bit, an APL of the first image has a range of (0, $(2^n-1)/2$], wherein n is a positive integer; a second processing unit configured to control the display device to display a second image, measure brightness of a central area of the second image, and obtain a second brightness, wherein the second image has a plurality of areas with different gray scales; the gray scale of the central area of the second image is minimum; and the single channel of the display device is n bit, an APL of the second image has a range of $[(2^n-1)/2, 2^n-1)$, wherein n is a positive integer; and a determining unit configured to determine the contrast of the display device according to the first brightness and the second brightness.

Another embodiment of the disclosure provides a measuring system, comprising: a driver configured to control a display device to respectively display a first image and a second image, wherein the first image has a plurality of areas with different gray scales and includes a maximum gray scale area and at least one non-maximum gray scale area; a test area of the first image is disposed in the maximum gray scale area; the second image has a plurality of areas with different gray scales and includes a minimum gray scale and at least one non-minimum gray scale area; and a test area of the second image is disposed in the minimum gray scale area; a brightness measuring device configured to respectively measure brightness of the test area of the first image and brightness of the test area of the second image; and a calculator configured to calculate the contrast according to the brightness of the test area of the first image and the brightness of the test area of the second image measured by the brightness measuring device.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

FIG. 2 is a flowchart of a contrast measuring method provided by the embodiment of the present invention;

FIGS. 3a and 3b are respectively a schematic operation diagram 1 for contrast measurement in the embodiment of the present invention;

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1A:
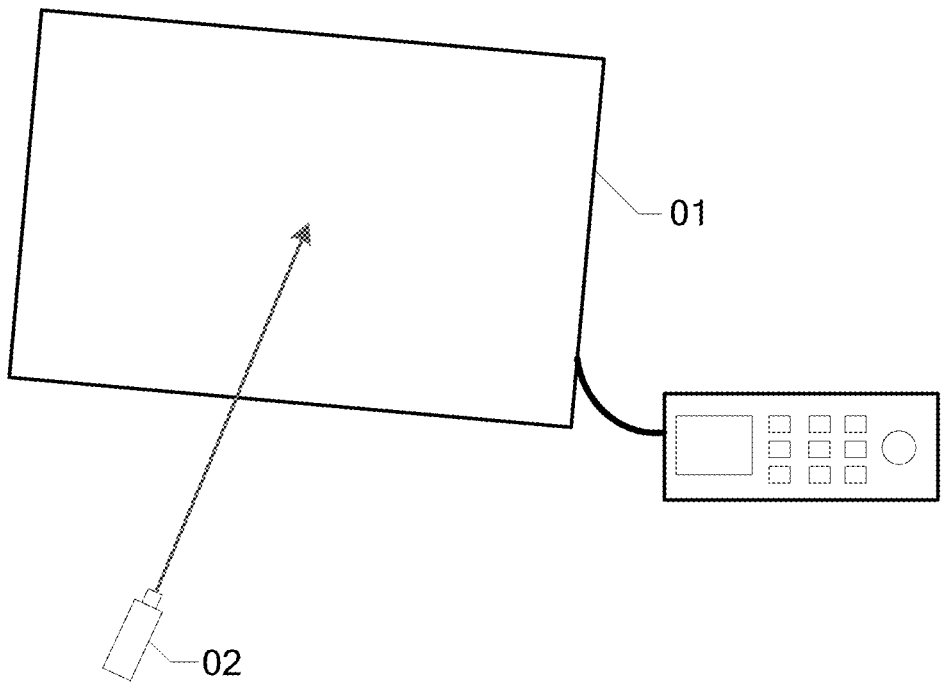
FIGS. 1a and 1b are respectively a schematic operation diagram for contrast measurement.
Figure 1B:
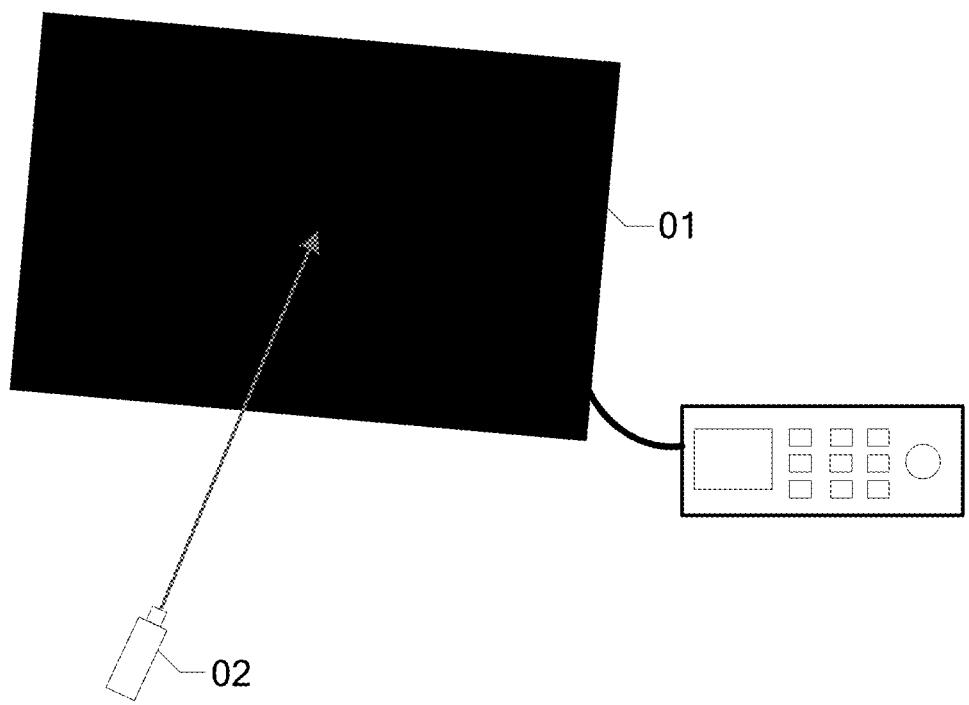

In a method for measuring the contrast of a display device: firstly, as illustrated in FIG. 1a, a full white field signal image (for instance, when the single channel is 8 bits, the signal level is 255 gray) is inputted into a display device 01, and a non-contact brightness measuring device 02, for instance, is perpendicular to the display device at a preset distance to measure the brightness of a central area of a screen of the display device and obtain the brightness Lw; secondly, as illustrated in FIG. 1b, a full black field signal image (for instance, the signal level is 0 gray) is inputted into the display device 01, and the non-contact brightness measuring device 02, for instance, is perpendicular to the display device at a preset distance to measure the brightness of the central area of the screen of the display device and obtain the brightness Lk; and finally, the contrast of the display device is calculated according to the brightness Lw and the brightness Lk, namely contrast=Lw/Lk.

The above contrast measuring method has some defects. For instance, more and more display products adopt dynamic backlight control (DBC), but DBC algorithms of various manufacturers are inconsistent, so the brightness difference can be large in the process of displaying the same image, and hence the contrast difference can be large. According to the traditional measuring method, the theoretical contrast may be up to one million and ten million and has large difference with the actual contrast, so the contrast of the display device cannot be measured by a unified standard. The requirement on the accuracy of the measuring device is high, so that the measuring cost can be high. In addition, the method measures the limit state of display and light emission of the display device, does not consider actual environment in which a user applies the display device, e.g., the service conditions such as office, video and surfing, and rarely uses full white images and full black images in actual use.

The embodiment of the present invention provides a measuring method for measuring contrast, which comprises:

controlling the display of a first image on a display device, measuring the brightness of a test area of the first image, and obtaining first brightness, in which the first image includes a maximum gray scale area and at least one non-maximum gray scale area, and the test area of the first image is disposed in the maximum gray scale area;

controlling the display of a second image on the display device, measuring the brightness of a test area of the second image, and obtaining second brightness, in which the second image includes a minimum gray scale area and at least one non-minimum gray scale area, and the test area of the second image is disposed in the minimum gray scale area; and determining the contrast of the display device according to the first brightness and the second brightness.

In one possible example, in the contrast measuring method provided by the embodiment of the present invention, the single channel of the display device is n bit, and the range of the average picture level (APL) of the first image is $(0, (2^n-1)/2]$, in which n is a positive integer.

In one possible example, in the contrast measuring method provided by the embodiment of the present invention, the range of the APL of the first image is $[2^{n-2}, 2^{n-1}-2^{n-3}]$.

In one possible example, in the contrast measuring method provided by the embodiment of the present invention, when the single channel of the display device is 8 bit, the range of the APL of the first image is [64, 96]; and when the bit width of the single channel of the display device is 10 bit, the range of the APL of the first image is [256, 384].

In one possible example, in the contrast measuring method provided by the embodiment of the present invention, when the single channel of the display device is 8 bit, the APL of the first image is 68; and when the bit width of the single channel of the display device is 10 bit, the APL of the first image is 272.

In one possible example, in the contrast measuring method provided by the embodiment of the present invention, in the first image, the maximum gray scale area and the at least one non-maximum gray scale area include local dimming subunits.

In one possible example, in the contrast measuring method provided by the embodiment of the present invention, in the first image, the maximum gray scale area and the at least one non-maximum gray scale area at least include two local dimming subunits.

In one possible example, in the contrast measuring method provided by the embodiment of the present invention, the maximum gray scale area is a central area of the first image.

In one possible example, in the contrast measuring method provided by the embodiment of the present invention, the first image is an image in which the gray scale is decreased progressively from the central area to the edge.

In one possible example, in the contrast measuring method provided by the embodiment of the present invention, the first image is divided into a plurality of windows expanded outwards from the central area; and the image in the same window has the same gray scale.

In one possible example, in the contrast measuring method provided by the embodiment of the present invention, when the windows in the first image are farther from the central area, the difference of the gray scales of images in two adjacent windows is smaller.

In one possible example, in the contrast measuring method provided by the embodiment of the present invention, the difference of the gray scales of the image in two adjacent windows of the first image is the same.

In one possible example, in the contrast measuring method provided by the embodiment of the present invention, in the first image, the window disposed in the central area is a rectangular structure, and all the other windows except the window disposed in the central area are of a frame structure.

In one possible example, in the contrast measuring method provided by the embodiment of the present invention, the minimum distance between an outer frame edge and an inner frame of each window with the frame structure in the first image in the vertical direction is all the same, and the minimum distance in the horizontal direction is all the same; or the minimum number of pixels between the outer frame edge and the inner frame of each windows with the frame structure in the first image in the vertical direction is all the same, and the minimum number of pixels in the horizontal direction is all the same.

In one possible example, in the contrast measuring method provided by the embodiment of the present invention, the width of the window with the rectangular structure in the first image is $W_1/N_1$, and the length is $L_1/N_1$; and the minimum distance between the outer frame edge and the inner frame of each window with the frame structure in the first image in the vertical direction is all $W_1/2N_1$, and the minimum distance in the horizontal direction is all $L_1/2N_1$, in which $W_1$ refers to the width of the first image; $L_1$ refers to the length of the first image; $N_1$ refers to the number of the windows in the first image; and $N_1 \geq 2$; or the number of pixels of the window with the rectangular structure in the first image in the vertical direction is $V_1/N_1$, and the number of pixels in the horizontal direction is $H_1/N_1$; and the minimum number of pixels between the outer frame edge and the inner frame of each windows with the frame structure in the first image in the vertical direction is all $V_1/2N_1$, and the minimum number of pixels in the horizontal direction is all $H_1/2N_1$, in which $V_1$ refers to the number of pixels of the first image in the vertical direction; $H_1$ refers to the number of pixels of the first image in the horizontal direction; $N_1$ refers to the number of the windows in the first image; and $N_1 \geq 2$.

In one possible example, in the contrast measuring method provided by the embodiment of the present invention, in the first image, the window disposed in the central area is a circular structure, and all the other windows except the window disposed in the central area are of a ring structure; or in the first image, the window disposed in the central area is an elliptical structure, and all the other windows except the window disposed in the central area are of an elliptical ring structure.

In one possible example, in the contrast measuring method provided by the embodiment of the present invention, when the single channel of the display device is n bit, the range of the APL of the second image is $[(2^n-1)/2, 2^n-1)$, in which n is a positive integer.

In one possible example, in the contrast measuring method provided by the embodiment of the present invention, the range of the APL of the second image is $[2^{n-1}+2^{n-3}, 2^{n-1}+2^{n-2}]$.

In one possible example, in the contrast measuring method provided by the embodiment of the present invention, when the single channel of the display device is 8 bit, the range of the APL of the second image is [160, 192]; and when the single channel of the display device is 10 bit, the range of the APL of the second image is [640, 768].

In one possible example, in the contrast measuring method provided by the embodiment of the present invention, when the single channel of the display device is 8 bit, the APL of the second image is 165; and when the single channel of the display device is 10 bit, the APL of the second image is 662.

In one possible example, in the contrast measuring method provided by the embodiment of the present invention, in the second image, the minimum gray scale area and the at least one non-minimum gray scale area include local dimming subunits.

In one possible example, in the contrast measuring method provided by the embodiment of the present invention, in the second image, the minimum gray scale area and the at least one non-minimum gray scale area at least include two local dimming subunits.

In one possible example, in the contrast measuring method provided by the embodiment of the present invention, the minimum gray scale area is a central area of the second image.

In one possible example, in the contrast measuring method provided by the embodiment of the present invention, the second image is an image in which the gray scale is increased progressively from the central area to the edge.

In one possible example, in the contrast measuring method provided by the embodiment of the present invention, the second image is divided into a plurality of windows expanded outwards from the central area; and the image in the same window has the same gray scale.

In one possible example, in the contrast measuring method provided by the embodiment of the present invention, when the windows in the second image are closer to the central area, the difference of the gray scales of the image in two adjacent windows is smaller.

In one possible example, in the contrast measuring method provided by the embodiment of the present invention, the difference of the gray scales of the image in two adjacent windows of the second image is the same.

In one possible example, in the contrast measuring method provided by the embodiment of the present invention, in the second image, the window disposed in the central area is a rectangular structure, and all the other windows except the window disposed in the central area are of a frame structure.

In one possible example, in the contrast measuring method provided by the embodiment of the present invention, the minimum distance between an outer frame edge and an inner frame edge of each window with the frame structure in the second image in the vertical direction is all the same, and the minimum distance in the horizontal direction is all the same; or the minimum number of pixels between the outer frame edge and the inner frame edge of each window with the frame structure in the second image in the vertical direction is all the same, and the minimum number of pixels in the horizontal direction is all the same.

In one possible example, in the contrast measuring method provided by the embodiment of the present invention, the width of the window with the rectangular structure in the second image is $W_2/N_2$, and the length is $L_2/N_2$; and the minimum distance between the outer frame edge and the inner frame edge of each window with the frame structure in the second image in the vertical direction is all $W_2/2N_2$, and the minimum distance in the horizontal direction is all $L_2/2N_2$, in which $W_2$ refers to the width of the second image; $L_2$ refers to the length of the second image; $N_2$ refers to the number of the windows in the second image; and $N_2 \geq 2$; or the number of pixels of the window with the rectangular structure in the second image in the vertical direction is $V_2/N_2$, and the number of pixels in the horizontal direction is $H_2/N_2$; and the minimum number of pixels between the outer frame edge and the inner frame edge of each window with the frame structure in the second image in the vertical direction is all $V_2/2N_2$, and the minimum number of pixels in the horizontal direction is all $H_2/2N_2$, in which $V_2$ refers to the number of pixels of the second image in the vertical direction; $H_2$ refers to the number of pixels of the second image in the horizontal direction; $N_2$ refers to the number of the windows in the second image; and $N_2 \geq 2$.

In one possible example, in the contrast measuring method provided by the embodiment of the present invention, in the second image, the window disposed in the central area is a circular structure, and all the other windows except the window disposed in the central area are of a ring structure; or in the second mage, the window disposed in the central area is an elliptical structure, and all the other windows except the window disposed in the central area are of an elliptical ring structure.

In one possible example, in the contrast measuring method provided by the embodiment of the present invention, the number of the windows in the first image is the same with the number of the windows in the second image.

In one possible example, in the contrast measuring method provided by the embodiment of the present invention, both the number of the windows in the first image and the number of the windows in the second image are 10.

The embodiment of the present invention further provides a measuring system for measuring contrast, comprising:

a first processing unit configured to control the display of a first image on a display device, measure the brightness of a test area of the first image, and obtain first brightness, in which the first image includes a maximum gray scale area and at least one non-maximum gray scale area, and the test area of the first image is disposed in the maximum gray scale area;

a second processing unit configured to control the display of a second image on the display device, measure the brightness of a test area of the second image, and obtain second brightness, in which the second image includes a minimum gray scale area and at least non-minimum gray scale area, and the test area of the second image is disposed in the minimum gray scale area; and a determining unit configured to determine the contrast of the display device according to the first brightness and the second brightness.

Detailed description will be given below to the preferred embodiments of the contrast measuring method and the measuring system thereof, provided by the embodiment of the present invention, with reference to the accompanying drawings.

The embodiment of the present invention provides a measuring method for measuring contrast, which, as illustrated in FIG. 2, specifically comprises the following steps:

S201: controlling the display of a first image on a display device, measuring the brightness of a test area of the first image, and obtaining first brightness, in which the first image has a plurality of areas with different gray scales and includes a maximum gray scale area (the maximum gray scale which can be displayed, for instance, when the single channel is 8 bit, the maximum gray scale area displays 255 gray, and so on) and at least one non-maximum gray scale area, and the test area of the first image is disposed in the maximum gray scale area;

S202: controlling the display of a second image on the display device, measuring the brightness of a test area of the second image, and obtaining second brightness, in which the second image has a plurality of areas with different gray scales and includes a minimum gray scale area (the minimum gray scale which can be displayed, e.g., 0 gray) and at least one non-minimum gray scale area, and the test area of the second image is disposed in the minimum gray scale area; and S203: determining the contract of the display device according to the first brightness and the second brightness obtained by measurement.

The display device in the embodiment of the present invention includes an electronic device capable of displaying such as a computer, a mobile phone and a digital camera, and also includes a component or an assembly capable of displaying such as a display panel and a display module. Any structure capable of achieving the display function shall all be included in the display device in the embodiment of the present invention. No limitation will be given here in the embodiment of the present invention.

It should be noted that the steps S201 and S202 may be executed in the following standard environment and test conditions:

1. Environment condition: the temperature is 25° C.±2° C.; the pressure intensity is ranged from 86 kPa to $10^6$ kPa; and the relative humidity (RH) is ranged from 25% to 85%.

2. Preheating condition: a sample to be tested (namely the display device) must be preheated before test; the preheating time is determined according to the preheating property of the sample to be tested; and the preheating time is at least 15 min.

3. Dark room condition: usually measured in a dark room with the illuminance of less than 11× (including 11×).

4. Test direction: adopting the viewing direction perpendicular to a surface of a screen of the sample to be tested, and ensuring the deviation of the direction to be ±0.3°.

Figure 3B:
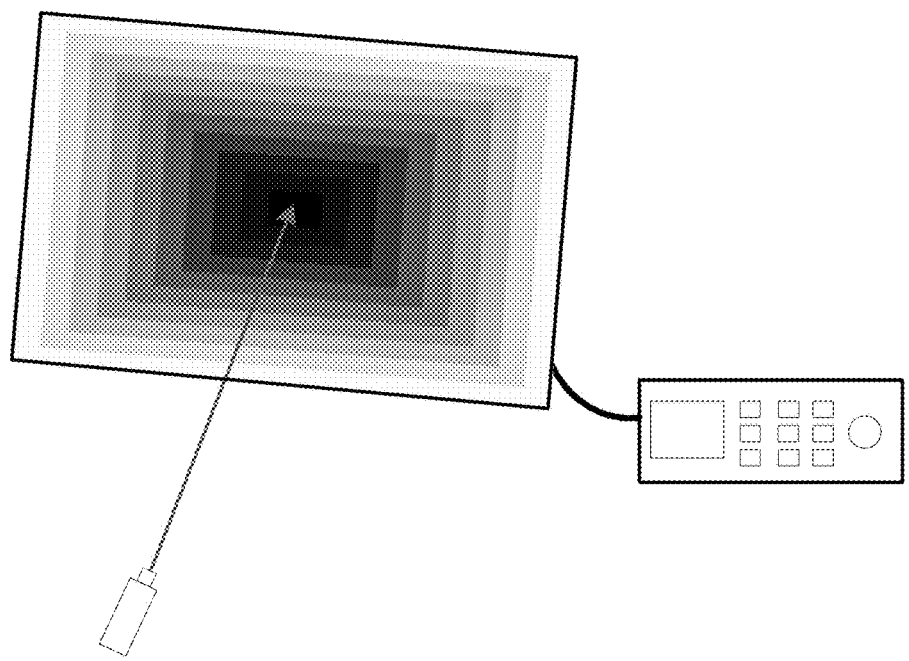
Figure 4A:
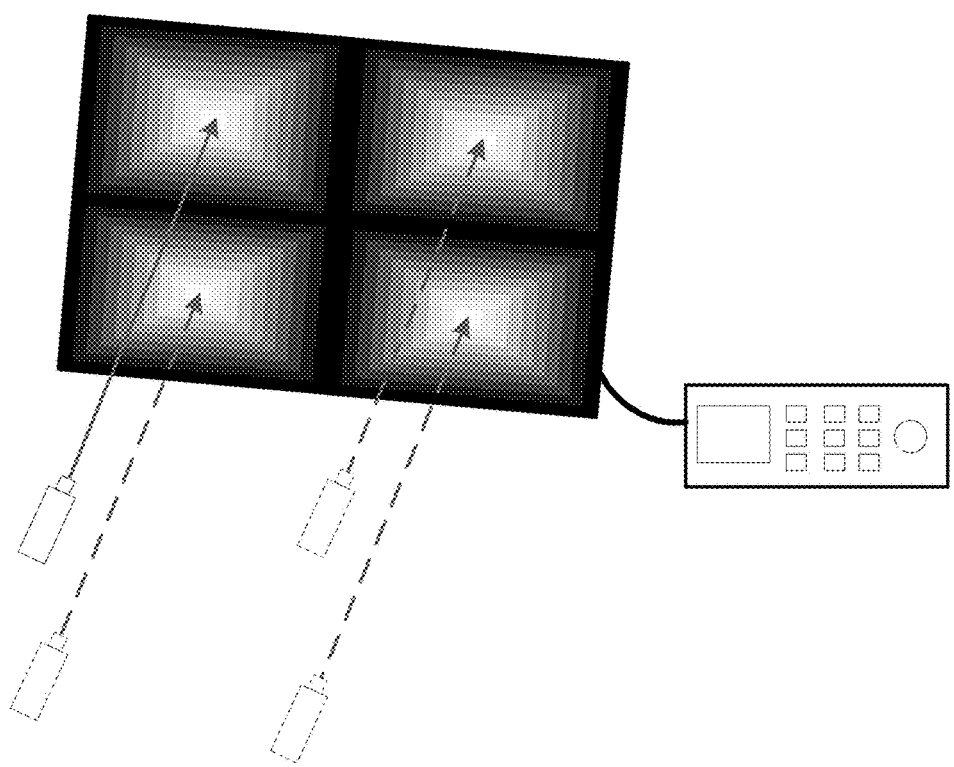
FIGS. 4a and 4b are respectively a schematic operation diagram 2 for contrast measurement in the embodiment of the present invention.
Figure 4B:
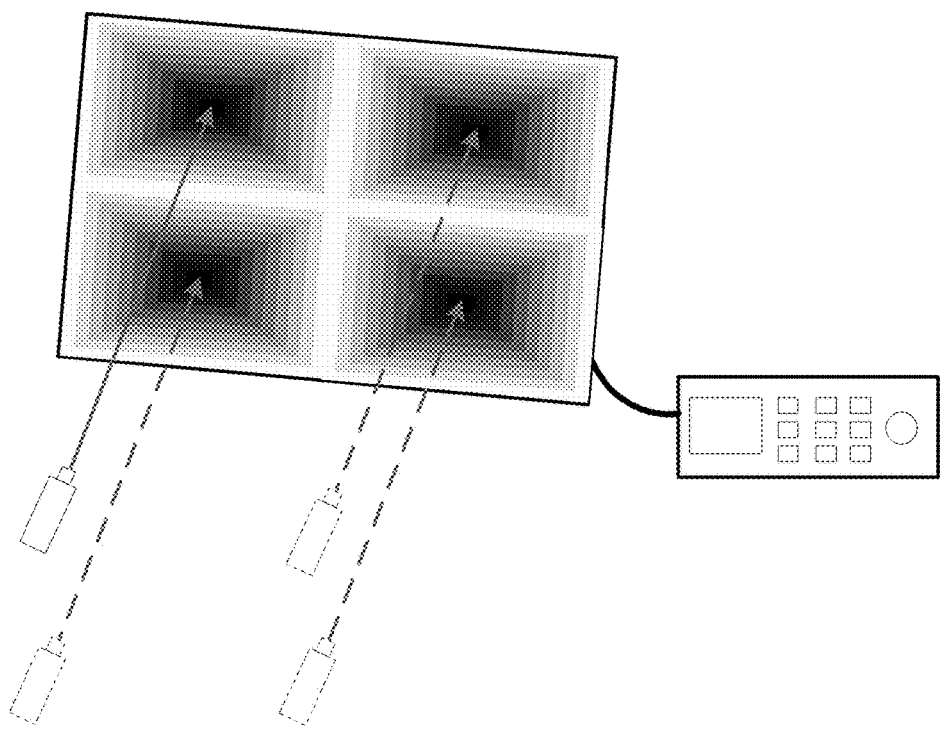

5. Measurement of the test area: the test area indicated here is not a test point in the geometric significance; the scope of the test area cannot be too large; in general, the test area respectively at least includes 500 pixels; and the test area may be a circular area, a rectangular area or an area of other shapes according to the test device and the test requirements. It should be noted that: as illustrated in FIGS. 3a and 3b, the first image and the second image displayed only include one test area; but the first image and the second image displayed may not only include one test area; if the first image is distributed with a plurality of maximum gray scale areas (as illustrated in FIG. 4a, the first image includes 4 maximum gray scale areas), namely the first image includes a plurality of test areas, the brightness of each test area must be respectively measured, and the average value of a plurality of measured brightness values may be taken as the first brightness; and if the second image is distributed with a plurality of minimum gray scale areas (as illustrated in FIG. 4b, the second image includes 4 minimum gray scale areas), namely the second image includes a plurality of test areas, the brightness of each test area must be respectively tested, and the average value of a plurality of measured brightness values may be taken as the second brightness.

6. When a non-contact brightness measuring device (brightness meter) is adopted for brightness measurement, the aperture angle of the measuring device is $\theta_{accept} \leq 5°$, the measuring distance between a center of the display device and a meter of the measuring device is generally recommended to be 50 cm; and a contact brightness measuring device may also be adopted for brightness measurement.

In the process of executing the step S203, specifically, the contrast of the display device may be calculated according to the ratio of the first brightness to the second brightness obtained by measurement, namely contrast=first brightness/second brightness.

In the contrast measuring method provided by the embodiment of the present invention, the first image and the second image respectively have a plurality of areas with different gray scales; the first image includes the maximum gray scale area and the at least one non-maximum gray scale area; the second image includes the minimum gray scale area and the at least one non-minimum gray scale area; the brightness of the maximum gray scale area of the first image is measured; the brightness of the minimum gray scale area of the second image is measured; and the contrast is determined. In this way, as illustrated in FIGS. 3a to 4b, the non-contact brightness measuring device, for instance, is perpendicular to the display device at a preset viewing distance to measure the brightness of the test area of the first image (the second image); at this point, the brightness distribution of the display images in actual application is taken into full consideration, and the measured brightness of the test area is closer to the actual use brightness; and hence the calculated contrast is closer to the actual contrast. In addition, the measuring method is relevant to display devices with DBC function, may measure various product performances by the same standard, and eliminates the impact of algorithms. Moreover, the requirement on the accuracy of the measuring device is low, so that the cost of the measuring device can be reduced.

In specific implementation, in the contrast measuring method provided by the embodiment of the present invention, when the single channel of the display device is n bit, the range of the APL of the first image is $(0, (2^{n-1})/2]$, in which n is a positive integer; specifically, when the single channel is 8 bit (namely n=8), the range of the APL of the first image may be greater than 0 and less than or equal to $(2^8-1)/2$, namely 127.5, or the range of the APL of the first image may be greater than 0 and less than 127.5, and appropriate range may also be selected according to actual demands; and when the single channel is 10 bit (namely n=10), the range of the APL of the first image may be greater than 0 and less than or equal to $(2^{10}-1)/2$, namely 511.5, or the range of the APL of the first image may be greater than 0 and less than 511.5, and appropriate range may also be selected according to actual demands.

The APL in the embodiment of the present invention is the APL calculated on the basis of the gray scale, namely the APL of an image is obtained by allowing the number of pixels corresponding to all the gray scales in the image to be multiplied by corresponding gray scale and allowing the sum to be divided by all the number of pixels of the image. For instance, taking an image of which the bit width of the single channel is 8 bit as an example, all the possible gray scales of the image are 0-255, so the APL of the image is: APL=($0*n_1+1*n_2+ \ldots +254*n_{(m-1)}+255*n_m$)/ ($n_1+n_2+ \ldots +n_{(m-1)}+n_m$), in which $n_1$ refers to the number of pixels of 0 gray; $n_2$ refers to the number of pixels of 1 gray; and by analogy, $n_{(m-1)}$ refers to the number of pixels of 254 gray, and $n_m$ refers to the number of pixels of 255 gray. The gray scale refers to the division of the difference between the maximum brightness and the minimum brightness into a plurality of parts, which provides convenience for the control of the screen brightness corresponding to signal input. Each digital image is composed of a plurality of points. These points are also referred to as pixels. In general, each pixel may show many different colors, for instance, is composed of three subpixels RGB. Light sources on the back of each subpixel may show different brightness levels. The gray scale represents the level of different brightness values between the maximum brightness to the minimum brightness. When the middle levels are more, the image effect capable of being presented is more delicate. For instance, 8 bit can show eighth power of 2 and is equal to 256 brightness levels, which are referred to as 256 gray scales, generally including 0-255 integer grays. Each pixel is composed of RGB with different brightness levels, and finally different color points are formed. That is to say, the color change of each point on the screen is actually brought by the change of the gray scales of the three subpixels RGB for forming the point.

Moreover, in specific implementation, in the contrast measuring method provided by the embodiment of the present invention, the range of the APL of the first image may be [$2^{n-2}$, $2^{n-1}-2^{n-3}$]. Specifically, when the single channel is 8 bit, the range of the APL of the first image, for instance, may be [64, 96], namely greater than or equal to 64 and less than or equal to 96; and when the single channel is 10 bit, the range of the APL of the first image, for instance, may be [256, 384], namely greater than or equal to 256 and less than or equal to 384.

For instance, in the contrast measuring method provided by the embodiment of the present invention, when the single channel is 8 bit, the range of the APL of the first image is 68. At this point, the first image is closer to the brightness distribution condition in actual application. In actual application, the value may fluctuate, for instance, may be 66, 67, 69 or 70, due to the errors caused by different computing methods or other reasons, as long as the APL of the first image is close to 68.

For instance, in the contrast measuring method provided by the embodiment of the present invention, when the single channel is 10 bit, the APL of the first image is 272. At this point, the first image is closer to the brightness distribution condition in actual application. In actual application, the value may fluctuate, for instance, may be 270, 271, 273 or 274, due to the errors caused by different computing methods or other reasons, as long as the APL of the first image is close to 272.

In specific implementation, in the contrast measuring method provided by the embodiment of the present invention, if DBC is adopted, in the first image, each area at least includes one local dimming subunit (a minimum unit capable of independently controlling backlight brightness); and when the scope of the area is too small and cannot include at least one local dimming subunit, the DBC algorithm will be very complex. For instance, in the first image, each area at least includes two local dimming subunits.

Figure 5A:
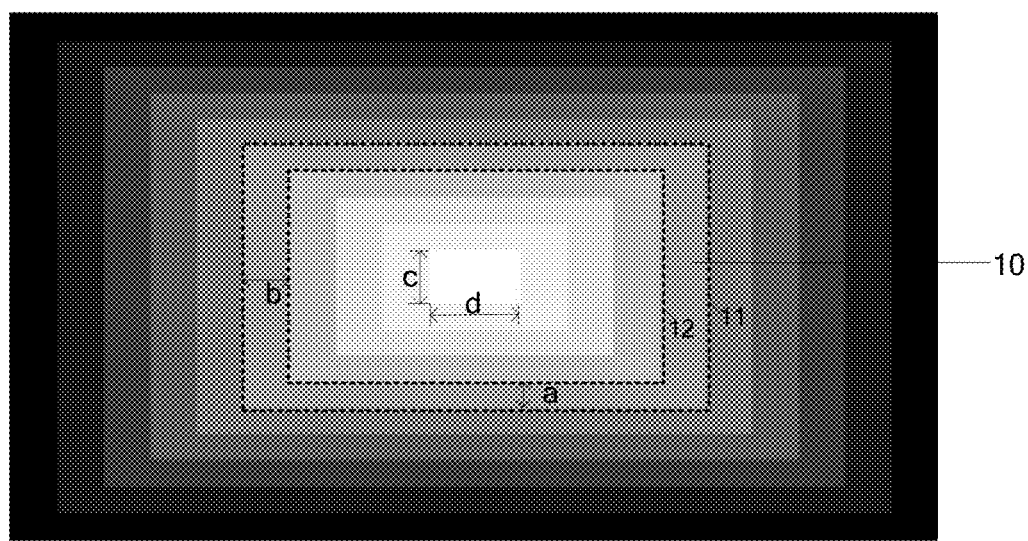
FIG. 5a is a schematic diagram of a first image in the embodiment of the present invention.

In specific implementation, in the contrast measuring method provided by the embodiment of the present invention, as illustrated in FIG. 5a, the maximum gray scale area may be set to be the central area of the first image, namely the test area of the first image is disposed in the central area of the first image.

It should be noted that: at this point, a measuring point is disposed in the central area of the sample to be tested, and the error is controlled to be ±3% of a diagonal of a display screen. In general, the central area at least includes 500 pixels. The central area not only may be a rectangular structure as illustrated in FIG. 5a but also may be a circular area, an elliptical area or an area of other shapes. No limitation will be given here.

In specific implementation, in the contrast measuring method provided by the embodiment of the present invention, the first image may be set to be an image in which the gray scale is decreased progressively from the central area to the edge.

In specific implementation, in the contrast measuring method provided by the embodiment of the present invention, when the first image is an image in which the gray scale is decreased progressively from the central area to the edge, in order to allow the first image to provide convenience for drive display and measurement, the first image may be divided into a plurality of windows expanded outwards from the central area, and as illustrated in FIG. 5a, the first image is divided into 10 windows expanded outwards from the central area; and the image in the same window may have the same gray scale.

The specific arrangement of the gray scales of the windows in the first image may be specifically designed according to actual demands. In the contrast measuring method provided by the embodiment of the present invention, the following examples may be specifically included.

Specifically, in the first example, in the contrast measuring method provided by the embodiment of the present invention, in order to satisfy the characteristic that people are relatively sensitive to scotopic vision, concretely, when the windows in the first image are farther from the central area, the difference of the gray scales of the image in two adjacent windows may be smaller. As illustrated in FIG. 5a, when the single channel is 8 bit, the gray scales of the 10 windows expanded outwards from the central area may be set to be 255, 224, 192, 160, 128, 96, 64, 32, 16, 0 in sequence; as can be seen, the difference of the gray scales of the image in two adjacent windows farther from the central area is 16, and the difference of the gray scales of the image in two adjacent windows closer to the central area is 32; and 16 gray in this group of gray scales may also satisfy the limitation of the minimum gray scale in some video fields, so that the first image can be further close to the brightness distribution condition of an actual display image. When the single channel is 10 bit, the gray scales of the 10 windows expanded outwards from the central area may be set to be 1023, 896, 768, 640, 512, 384, 256, 128, 64 and 0 in sequence; and as can be seen, the difference of the gray scales of images in two adjacent windows farther from the central area is 64, and the difference of the gray scales of images in two adjacent windows closer to the central area is 128. When the single channel is 10 bit, the first image is divided into 18 windows expanded outwards from the central area, and the gray scales of the 18 windows expanded outwards from the central area may be set to be 1023, 960, 896, 832, 768, 704, 640, 576, 512, 448, 384, 320, 256, 192, 128, 64, 32 and 0 in sequence; and as can be seen, the difference of the gray scales of images in two adjacent windows farther from the central area is 32, and the difference of the gray scales of images in two adjacent windows closer to the central area is 64, so that the limitation of the minimum gray scale in some video fields can be satisfied, and hence the first image can be further closer to the brightness distribution condition of an actual display image.

Specifically, in the second example, in the contrast measuring method provided by the embodiment of the present invention, in order to cover the brightness level of an actual display image and simultaneously consider the convenience of measurement, concretely, the difference of the gray scales of the image in two adjacent windows in the first image may be set to be the same. For instance, when the single channel is 8 bit, the first image is divided into 9 windows expanded outwards from the central area, and the gray scales of the 9 windows may be set to be 255, 224, 192, 160, 128, 96, 64, 32 and 0 in sequence; the first image is divided into 5 windows expanded outwards from the central area, and the gray scales of the 5 windows may be set to be 255, 192, 128, 64 and 0 in sequence; the first image is divided into 3 windows expanded outwards from the central area, and the gray scales of the 3 windows may be set to be 255, 128 and 0 in sequence; and the first image is divided into 16 windows expanded outwards from the central area, and the gray scales of the 16 windows may be set to be 255, 240, 224, 208, 192, 176, 160, 144, 128, 112, 96, 80, 64, 48, 32, 16 and 0 in sequence.

Specifically, in the third example, in the contrast measuring method provided by the embodiment of the present invention, when the windows in the first image are farther from the central area, the difference of the gray scales of images in two adjacent windows may also be larger. For instance, when the single channel is 8 bit, the first image is divided into 8 windows expanded outwards from the central area, and the gray scales of the 8 windows may be set to be 255, 224, 192, 160, 128, 96, 64 and 0 in sequence.

In specific implementation, which example is specifically selected may be designed according to actual demands No limitation will be given here. It should be noted that the specific arrangement of the gray scales of the windows in the first image in the embodiment of the present invention only needs to satisfy the requirement that the measured first image is close to the brightness distribution condition of an actual display image, and is not limited to the above preferred examples. As illustrated in FIG. 5a, when the single channel is 8 bit and the gray scales of the 10 windows are set to be 255, 224, 192, 160, 128, 96, 64, 32, 16 and 0 in sequence, the measured APL of the first image is 67.99, which is close to the brightness distribution condition of the actual display image. When the single channel is 10 bit and the gray scales of the 10 windows are set to be 1023, 896, 768, 640, 512, 384, 256, 128, 64 and 0 in sequence, the measured APL of the first image is 271.99, which is close to the brightness distribution condition of the actual display image.

In specific implementation, when the first image is a rectangular structure, in the contrast measuring method provided by the embodiment of the present invention, in the first image, the window disposed in the central area may be set to be a rectangular structure, and all the other windows except the window disposed in the central area may be set to be of a frame structure (a mark 10 of a dotted line frame in FIG. 5a represents a frame structure). The "frame structure" is similar to "picture frame structure", namely being similar to a frame structure of which the inside is provided with a hollow structure. As illustrated in FIG. 5a, the frame structure 10 includes an outer frame edge 11 and an inner frame edge 12.

It should be noted that: in specific implementation, when the first image is a circular structure, the window disposed in the central area may be set to be a circular structure; all the other windows except the window disposed in the central area may be set to be a ring structure; and the ring structure includes an outer ring and an inner ring. When the first image is an elliptical structure, the window disposed in the central area may be set to be an elliptical structure; all the other windows except the window disposed in the central area may be set to be an elliptical ring structure; and the elliptical ring structure includes an outer ring and an inner ring. The shape of the window disposed in the central area and other windows may be determined according to the shape of the actual first image, and is not limited to the rectangular structure and the frame structure involved in the accompanying drawings of the present invention. In actual process, the specific shape and size, e.g., the angle and the length, of the windows may have some deviation. No limitation will be given here.

When the gray scale of the image in the window disposed in the central area is maximum (for instance, when the single channel is 8 bit, the gray scale is 255; and for instance, when the bit width of the single channel is 10 bit, the gray scale is 1023), namely the image displayed in the window disposed in the central area is a white image, as the first image is an image in which the gray scale is decreased progressively from the central area to the edge, the gray scale of an image in a window disposed on the outmost of the first image (the farthest from the central area) may be minimum, namely the image displayed in the outmost window may be a black image, so that the brightness of the central area of the first image can be further closer to the actual use brightness.

Taking the first image in which the window disposed in the central area is a rectangular structure and all the other windows except the window disposed in the central area are of a frame structure as an example, the specific size of the windows in the first image may be specifically designed according to actual demands. In the contrast measuring method provided by the embodiment of the present invention, the following two examples may be specifically selected.

In specific implementation, in the first embodiment, in the contrast measuring method provided by the embodiment of the present invention, for the convenience of pixel drive, the minimum distance between an outer frame edge and an inner frame edge of each window with the frame structure in the first image in the vertical direction may be set to be the same, and the distance in the horizontal direction may be set to be the same. As illustrated in FIG. 5a, the minimum distance a between the outer frame edge and the inner frame edge of each window with the frame structures in the first image in the vertical direction is all the same, and the minimum distance b in the horizontal direction is all the same. Similarly, when the first image is a circular structure, the minimum distance between an outer ring and an inner ring of each window with the ring structure may also be set to be the same.

Moreover, in specific implementation, in the contrast measuring method provided by the embodiment of the present invention, as illustrated in FIG. 5a, the width c of the window with the rectangular structure in the first image may be set to be $W_1/N_1$, and the length d may be set to be $L_1/N_1$; and the distance a between the outer fame and the inner frame edge of each window with the frame structure in the first image in the horizontal direction may be all set to be $W_1/2N_1$, and the distance b between the outer frame edge and the inner frame edge in the vertical direction may be all set to be $L_1/2N_1$, in which $W_1$ refers to the width of the first image; $L_1$ refers to the length of the first image; $N_1$ refers to the number of the windows in the first image; and $N_1 \geq 2$. At this point, in FIG. 5a, $N_1=10$.

In specific implementation, in the second example, in the contrast measuring method provided by the embodiment of the present invention, the minimum number of pixels between the outer frame edge and the inner frame edge of each window with the frame structure in the first image in the vertical direction may be all set to be the same, and the minimum number of pixels in the horizontal direction may be all set to be the same. The "minimum number of pixels" here refers to a value obtained when the number of pixels between the outer frame edge and the inner frame edge is minimum. Similarly, when the first image is a circular structure, the minimum number of pixels between the outer ring and the inner ring of each window with the ring structure may also be set to be the same.

Moreover, in specific implementation, in the contrast measuring method provided by the embodiment of the present invention, the number of pixels of the window with the rectangular structure in the first image in the vertical direction is $V_1/N_1$, and the number of pixels in the horizontal direction is $H_1/N_1$; and the minimum number of pixels between the outer frame edge and the inner frame edge of each window with the frame structure in the first image in the vertical direction is all $V_1/2N_1$, and the minimum number of pixels in the horizontal direction is all $H_1/2N_1$, in which $V_1$ refers to the number of pixels of the first image in the vertical direction; $H_1$ refers to the number of pixels of the first image in the horizontal direction; $N_1$ refers to the number of the windows in the first image; and $N_1 \geq 2$.

When the values $W_1/N_1$ and $L_1/N_1$ in the first example are not integers, it is unfavorable for the arrangement of the windows on the first image, for instance, the number of pixels in the second example may be adopted to set the size of the windows. In specific implementation, which example is specifically selected may be designed according to actual demands No limitation will be given here.

It should be noted that the windows in the first image in the embodiment of the present invention are divided according to areas with different gray scales, and a plurality of windows in the shape of strip, checkerboard, the shape of the first image as illustrated in FIG. 4a, or other shapes, and even irregular shape, may also be divided, as long as the first image can be close to the brightness distribution condition of the actual display image, and the shape is not limited to the shapes involved in the accompanying drawings.

In specific implementation, in the contrast measuring method provided by the embodiment of the present invention, when the single channel of the display device is n bit, the range of the APL of the second image is $[(2^n-1)/2, 2^n-1)$, in which n is a positive integer; specifically, when the single channel is 8 bit (namely n=8), the range of the APL of the second image may be greater than or equal to $(2^8-1)/2$, namely 127.5, and less than 255, or the range of the APL of the second image may be greater than 127.5 and less than 255, and appropriate range may be selected according to actual demands; and when the single channel is 10 bit (namely n=10), the range of the APL of the second image may be greater than or equal to $(2^{10}-1)/2$, namely 511.5, and less than 1023, or the range of the APL of the second image may be greater than 511.5 and less than 1023, and appropriate range may be selected according to actual demands.

Moreover, in specific implementation, in the contrast measuring method provided by the embodiment of the present invention, the range of the APL of the second image may be $[2^{n-1}+2^{n-3}, 2^{n-1}+2^{n-2}]$; specifically, when the single channel is 8 bit, the range of the APL of the second image, for instance, may be [160, 192], namely greater than or equal to 160 and less than or equal to 192; and when the single channel is 10 bit, the range of the APL of the second image, for instance, may be [640, 768], namely greater than or equal to 640 and less than or equal to 768.

For instance, in the contrast measuring method provided by the embodiment of the present invention, when the single channel of the display device is 8 bit, the APL of the second image is set to be 165, and at this point, the second image is closer to the brightness distribution condition in actual application. In actual application, the value may fluctuate, for instance, may be 163, 164, 166 or 167, due to the errors caused by different computing methods or other reasons, as long as the APL of the first image is close to 165.

For instance, in the contrast measuring method provided by the embodiment of the present invention, when the single channel of the display device is 10 bit, the APL of the second image is 662, and at this point, the second image is closer to the brightness distribution condition in actual application. In actual application, the value may fluctuate, for instance, may be 660, 661, 663 or 664, due to the errors caused by different computing methods or other reasons, as long as the APL of the first image is close to 662.

In specific implementation, in the contrast measuring method provided by the embodiment of the present invention, if DBC is adopted, in the second image, the area at least includes one logical dimming subunit (a minimum unit capable of independently controlling backlight brightness); and when the scope of the area is too small and cannot include at least one local dimming subunit, the DBC algorithm will be very complex. For instance, in the second image, the area at least includes two local dimming subunits.

Figure 5B:
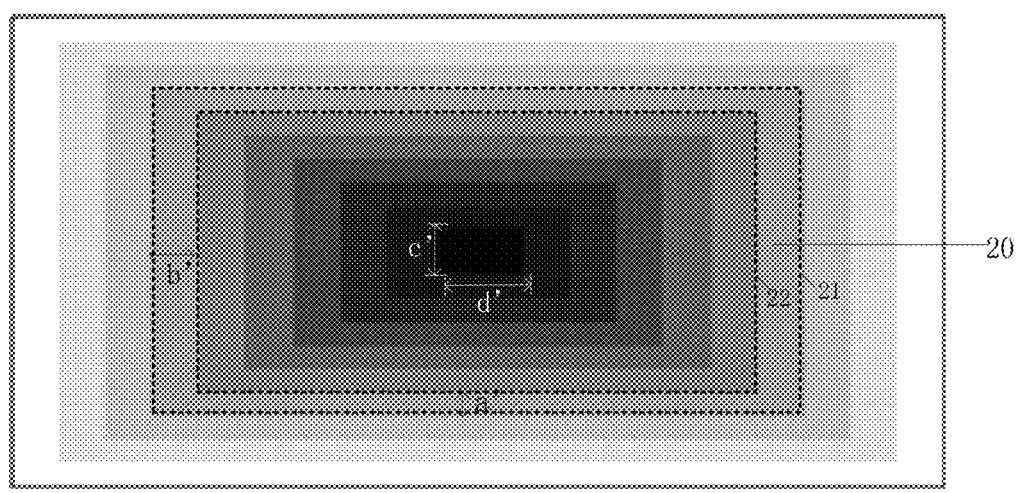
FIG. 5b is a schematic diagram of a second image in the embodiment of the present invention.

In specific implementation, in the contrast measuring method provided by the embodiment of the present invention, as illustrated in FIG. 5b, the minimum gray scale area may be set to be the central area of the second image, namely the test area of the second image is disposed in the central area of the second image.

It should be noted that: at this point, a measuring point is disposed in the central area of the sample to be tested, and the error is controlled to be ±3% of a diagonal of a display screen. In general, the central area at least includes 500 pixels. The central area not only may be a rectangular structure as illustrated in FIG. 5b but also may be a circular area, an elliptical area or an area of other shapes. No limitation will be given here.

In specific implementation, in the contrast measuring method provided by the embodiment of the present invention, the second image is an image in which the gray scale is increased progressively from the central area to the edge.

In specific implementation, in the contrast measuring method provided by the embodiment of the present invention, when the second image is an image in which the gray scale is increased progressively from the central area to the edge, in order to allow the second image to provide convenience for drive display and measurement, the second image may be divided into a plurality of windows expanded outwards from the central area, and as illustrated in FIG. 5b, the second image is divided into 10 windows expanded outwards from the central area; and the image in the same window may have the same gray scale.

The specific arrangement of the gray scales of the windows in the second image may be specifically designed according to actual demands. In the contrast measuring method provided by the embodiment of the present invention, the following examples may be specifically included.

Specifically, in the first example, in the contrast measuring method provided by the embodiment of the present invention, in order to satisfy the characteristic that people are relatively sensitive to scotopic vision, concretely, when the windows in the second image are closer to the central area, the difference of the gray scales of images in two adjacent two windows may be smaller; as illustrated in FIG. 5b, when the single channel is 8 bit, the gray scales of the 10 windows expanded outwards from the central area may be set to be 0, 16, 32, 64, 96, 128, 160, 192, 224 and 255 in sequence; as can be seen, the difference of the gray scales of the image in two adjacent windows closer to the central area is 16, and the difference of the gray scales of images in two adjacent windows farther from the central area is 32; and 16 gray in this group of gray scales may also satisfy the limitation of the minimum gray scale in some video fields, so that the second image can be further close to the brightness distribution condition of an actual display image. When the single channel is 10 bit, the gray scales of the 10 windows expanded outwards from the central area may be set to be 0, 64, 128, 256, 384, 512, 640, 768, 896, and 1023 in sequence; and as can be seen, the difference of the gray scales of the image in two adjacent windows closer to the central area is 64, and the difference of the gray scales of the image in two adjacent windows farther from the central area is 128. When the single channel is 10 bit, the second image is divided into 18 windows expanded outwards from the central area, and the gray scales of the 18 windows expanded outwards from the central area may be set to be 0, 32, 64, 128, 192, 256, 320, 384, 448, 512, 576, 640, 704, 768, 832, 896, 960 and 1023 in sequence; and as can be seen, the difference of the gray scales of the image in two adjacent windows closer to the central area is 32, and the difference of the gray scales of the image in two adjacent windows farther from the central area is 64, so that the limitation of the minimum gray scale in some video fields can be satisfied, and hence the second image can be further closer to the brightness distribution condition of the actual display image.

Specifically, in the second example, in the contrast measuring method provided by the embodiment of the present invention, in order to cover the brightness level of an actual display image and simultaneously consider the convenience of measurement, concretely, the difference of the gray scales of the image in two adjacent windows in the second image may be set to be the same. For instance, when the single channel is 8 bit, the second image is divided into 9 windows expanded outwards from the central area, and the gray scales of the 9 windows may be set to be 0, 32, 64, 96, 128, 160, 192, 224, and 255 in sequence; the second image is divided into 5 windows expanded outwards from the central area, and the gray scales of the 5 windows may be set to be 0, 64, 128, 192 and 255 in sequence; the second image is divided into 3 windows expanded outwards from the central area, and the gray scales of the 3 windows may be set to be 0, 128 and 255 in sequence; and the second image is divided into 16 windows expanded outwards from the central area, and the gray scales of the 16 windows may be set to be 0, 16, 32, 48, 64, 80, 96, 112, 128, 144, 160, 176, 192, 208, 224, 240 and 255 in sequence.

Specifically, in the third example, in the contrast measuring method provided by the embodiment of the present invention, when the windows in the second image are closer to the central area, the difference of the gray scales of images in two adjacent windows may also be larger. For instance, when the single channel is 8 bit, the second image is divided into 8 windows expanded outwards from the central area, and the gray scales of the 8 windows may be set to be 0, 64, 96, 128, 160, 224 and 255 in sequence.

In specific implementation, which example is specifically selected may be designed according to actual demands No limitation will be given here. It should be noted that the specific arrangement of the gray scales of the windows in the second image in the embodiment of the present invention only needs to satisfy the requirement that the measured second image is close to the brightness distribution condition of the actual display image, and is not limited to the above preferred examples. As illustrated in FIG. 5b, when the gray scales of the 10 windows are set to be 255, 224, 192, 160, 128, 96, 64, 32, 16, and 0 in sequence, the measured APL of the second image is 165.41, which is close to the brightness distribution condition of the actual display image. When the single channel is 10 bit and the gray scales of the 10 windows are set to be 0, 64, 128, 256, 384, 512, 640, 768, 896, and 1023 in sequence, the measured APL of the second image is 662.21, which is close to the brightness distribution condition of the actual display image.

In specific implementation, when the second image itself is a rectangular structure, in the contrast measuring method provided by the embodiment of the present invention, in the second image, the window disposed in the central area may be set to be a rectangular structure, and all the other windows except the window disposed in the central area may be set to be of a frame structure (a mark 20 of a dotted line frame in FIG. 5b represents a frame structure). The "frame structure" is similar to "picture frame structure", namely being similar to a frame structure of which the inside is provided with a hollow structure. As illustrated in FIG. 5b, the frame structure 20 includes an outer frame edge 21 and an inner frame edge 22.

It should be noted that: in specific implementation, when the second image is a circular structure, the window disposed in the central area may be set to be a circular structure; all the other windows except the window disposed in the central area may be set to be of a ring structure; and the ring structure includes an outer ring and an inner ring. When the second image is an elliptical structure, the window disposed in the central area may be set to be an elliptical structure; all the other windows except the window disposed in the central area may be set to be an elliptical ring structure; and the elliptical ring structure includes an outer ring and an inner ring. The shape of the window disposed in the central area and other windows may be determined according to the shape of the actual second image, and is not limited to the rectangular structure and the frame structure involved in the accompanying drawings of the present invention. In actual process, the specific shape and size, e.g., the angle and the length, of the windows may have some deviation. No limitation will be given here.

When the gray scale of the image in the window disposed in the central area is minimum, namely the image displayed in the window disposed in the central area is a black image, as the second image is an image in which the gray scale is increased progressively from the central area to the edge, the gray scale of an image in a window disposed on the outmost of the second image (the farthest from the central area) may be minimum, namely the image displayed in the outmost window may be a white image, so that the brightness of the central area of the second image can be further closer to the actual use brightness.

Taking the second image in which the window disposed in the central area is a rectangular structure and all the other windows except the window disposed in the central area are a frame structure as an example, the specific size of the windows in the second image may be specifically designed according to actual demands. In the contrast measuring method provided by the embodiment of the present invention, the following two examples may be specifically selected.

In specific implementation, in the first embodiment, in the contrast measuring method provided by the embodiment of the present invention, for the convenience of pixel drive, the minimum distance between outer frame edges and inner frame edges of the windows with the frame structures in the second image in the vertical direction may be set to be same, and the distance in the horizontal direction may be set to be the same. As illustrated in FIG. 5b, the minimum distance a' between the outer frame edge and the inner frame edge of each window with the frame structure in the second image in the vertical direction is all the same, and the minimum distance b' in the horizontal direction is all the same. Similarly, when the second image is a circular structure, the minimum distance between the outer ring and the inner ring of each window with the ring structure may also be set to be the same.

Moreover, in specific implementation, in the contrast measuring method provided by the embodiment of the present invention, as illustrated in FIG. 5b, the width c' of the window with the rectangular structure in the second image may be set to be $W_2/N_2$, and the length d' may be set to be $L_2/N_2$; and the distance a' between the outer fame and the inner frame edge of each window with the frame structure in the second image in the horizontal direction may be all set to be $W_2/2N_2$, and the distance b' between the outer frame edge and the inner frame edge in the vertical direction may be all set to be $L_2/2N_2$, in which $W_2$ refers to the width of the second image; $L_2$ refers to the length of the second image; $N_2$ refers to the number of the windows in the second image; and $N_2 \geq 2$. At this point, in FIG. 5b, $N_2=10$.

In specific implementation, in the second example, in the contrast measuring method provided by the embodiment of the present invention, the minimum number of pixels between the outer frame edge and the inner frame edge of each window with the frame structure in the second image in the vertical direction may be all set to be the same, and the minimum number of pixels in the horizontal direction may be all set to be the same. The "minimum number of pixels" here refers to a value obtained when the number of pixels between the outer frame edge and the inner frame edge is minimum. Similarly, when the second image is a circular structure, the minimum number of pixels between an outer ring and an inner ring of each window with the ring structure may also be set to be the same.

Moreover, in specific implementation, in the contrast measuring method provided by the embodiment of the present invention, the number of pixels of the window with the rectangular structure in the second image in the vertical direction is $V_2/N_2$, and the number of pixels in the horizontal direction is $H_2/N_2$; and the minimum number of pixels between the outer frame edge and the inner frame edge of each window with the frame structure in the second image is all $V_2/2N_2$, and the minimum number of pixels in the horizontal direction is all $H_2/2N_2$, in which $V_2$ refers to the number of pixels of the second image in the vertical direction; $H_2$ refers to the number of pixels of the second image in the horizontal direction; $N_2$ refers to the number of the windows in the second image; and $N_2 \geq 2$.

When the values $W_2/N_2$ and $L_2/N_2$ in the second example are not integers, it is unfavorable for the arrangement of the windows on the second image, for instance, the number of pixels in the second example may be adopted to set the size of the windows. In specific implementation, which example is specifically selected may be designed according to actual demands No limitation will be given here.

It should be noted that the windows in the second image in the embodiment of the present invention are divided according to areas with different gray scales, and a plurality of windows in the shape of strip, checkerboard, the shape of the second image as illustrated in FIG. 4b, or other shapes, and even irregular shape, may also be divided, as long as the second image can be close to the brightness distribution condition of the actual display image, and the shape is not limited to the shapes involved in the accompanying drawings.

In specific implementation, in the contrast measuring method provided by the embodiment of the present invention, in order to provide more convenience for measurement, the number of the windows in the first image and the number of the windows in the second image may be set to be the same, namely $N_1=N_2$.

For instance, in the contrast measuring method provided by the embodiment of the present invention, as illustrated in FIGS. 5a and 5b, both the first image and the second image are divided into 10 windows.

It should be noted that: as for the selection of the number of the windows in the first image and the second image, preferably, whether the number of pixels in the windows of the first image and the second image is an integer may be determined (for instance, calculating the minimum number of pixels between the outer frame edge and the inner frame of each window with the frame structure in the first image and the second image in the vertical direction, and the minimum number of pixels in the horizontal direction, respectively, and determining whether they are integers); and when both the number of pixels are integers, the number of the windows is the optimum selection.

On the basis of the same invention concept, the embodiment of the present invention further provides a measuring system for measuring contrast. As the principles of solving the problems of the measuring system are similar to those of the foregoing contrast measuring method, the embodiments of the measuring system may refer to the embodiments of the contrast measuring method. No further description will be given here.

In specific implementation, the measuring system provided by the embodiment of the present invention comprises:

a first processing unit configured to control the display of a first image on a display device, measure the brightness of a test area of the first image, and obtain first brightness, in which the first image has a plurality of areas with different gray scale and includes a maximum gray scale area and at least one non-maximum gray scale area, and the test area of the first image is disposed in the maximum gray scale area;

a second processing unit configured to control the display of a second image on the display device, measure the brightness of a test area of the second image, and obtain second brightness, in which the second image has a plurality of areas with different gray scales and includes a minimum gray scale area and at least one non-minimum gray scale area, and the test area of the second image is disposed in the minimum gray scale area; and a determining unit configured to determine the contrast of the display device according to the first brightness and the second brightness.

It should be noted that the first processing unit and the second processing unit may be the same unit, for instance, a driving unit of the display device, and may also be different units. No limitation will be given here in the present invention. The determining unit may be specifically configured to calculate the contrast of the display device according to the ratio of the first brightness and the second brightness obtained by measurement, for instance, contrast=first brightness/second brightness. That is to say, the first processing unit and the second processing unit may be a driver of the display device. The driver can control a display to achieve the foregoing image display in the measuring process. The determining unit may be a calculator which is configured to calculate the contrast according to the first brightness and the second brightness obtained by measurement.

In addition, the measuring system provided by the embodiment of the present invention may further comprise a brightness measuring device. The brightness measuring device measures the brightness when the first processing unit and the second processing unit control the display to achieve the foregoing image display.

In some embodiments, the measuring system provided by the present invention comprises:

a driver configured to control the display device to respectively display a first image and a second image, in which the first image has a plurality of areas with different gray scales and includes a maximum gray scale area and at least one non-maximum gray scale area; a test area of the first image is disposed in the maximum gray scale area; the second image has a plurality of areas with different gray scales and includes a minimum gray scale and at least one non-minimum gray scale area; and a test area of the second image is disposed in the minimum gray scale area;

a brightness measuring device configured to respectively measure the brightness of the test area of the first image and the brightness of the test area of the second image; and a calculator configured to calculate the contrast according to the brightness of the test area of the first image and the brightness of the test area of the second image, measured by the brightness measuring device.

The contents such as the control of image display in the embodiments may refer to the foregoing embodiments. No further description will be given here.

In specific implementation, when the measuring system for measuring the contrast, provided by the embodiment of the present invention, is adopted, as for a display device with DBC function, the measuring system may measure various product performances by the same standard, and hence eliminates the impact of algorithms. In addition, as the calculation result of the measuring system is closer to the actual application condition, the brightness distribution condition of the display image in actual application is taken into full consideration. Moreover, the requirement on the accuracy of the measuring device is low, so that the cost of the measuring device can be reduced.

The measuring method and the measuring system for measuring the contrast, provided by the embodiment of the present invention, comprise: firstly, controlling the display of a first image on a display device, measuring the brightness of a test area of the first image, and obtaining first brightness, in which the first image has a plurality of areas with different gray scales and includes a maximum gray scale area and at least one non-maximum gray scale area, and the test area of the first image is disposed in the maximum gray scale area; secondly, controlling the display of a second image on the display device, measuring the brightness of a test area of the second image, and obtaining second brightness, in which the second image has a plurality of areas with different gray scales and includes a minimum gray scale area and at least one non-minimum gray scale area, and the test area of the second image is disposed in the minimum gray scale area; and finally, determining the contrast of the display device according to the first brightness and the second brightness. The present invention is relevant to display devices with DBC function, provides a preferred measuring method, may measure various product performances by the same standard, and hence eliminates the impact of algorithms. In addition, as the calculation result of the method is closer to the actual application condition, the brightness distribution condition of the display image in actual application is taken into full consideration. Moreover, the requirement on the accuracy of the measuring device is low, so that the cost of the measuring device can be reduced.

The foregoing is only the preferred embodiments of the present invention and not intended to limit the scope of protection of the present invention. The scope of protection of the present invention should be defined by the appended claims.

The application claims priority to the Chinese patent application No. 201610069779.1, filed Feb. 1, 2016, the disclosure of which is incorporated herein by reference as part of the application.

The invention claimed is:

1. A measuring method for measuring contrast of a display device, comprising:
controlling the display device to display a first image by a driver, measuring brightness of a central area of the first image by a brightness measuring device, and obtaining a first brightness, wherein the first image includes a maximum gray scale area and at least one non-maximum gray scale area, and a test area of the first image is disposed in the maximum gray scale area;
controlling the display device to display a second image by the driver, measuring brightness of a central area of the second image by the brightness measuring device, and obtaining a second brightness, wherein the second image includes a minimum gray scale area and at least one non-minimum gray scale area, and a test area of the second image is disposed in the minimum gray scale area; and
calculating the contrast of the display device by a calculator according to the first brightness and the second brightness.

2. The measuring method according to claim 1, wherein the display device has a single channel of n bit, and an average picture level (APL) of the first image has a range of $(0, (2^n-1)/2]$, wherein n is a positive integer.

3. The measuring method according to claim 2, wherein the range of the APL of the first image is $[2^{n-2}, 2^{n-1}-2^{n-3}]$.

4. The measuring method according to claim 1, wherein in the first image, each area at least includes one local dimming subunit.

5. The measuring method according to claim 1, wherein the first image is an image with gray scales decreased progressively from its central area to its edge.

6. The measuring method according to claim 5, wherein the first image is divided into a plurality of windows expanded outwards from the central area; and
the image in a same window has a same gray scale.

7. The measuring method according to claim 6, wherein the larger a distance between the windows and the central area in the first image is, the smaller a difference between the gray scales of the image in two adjacent windows is.

8. The measuring method according to claim 6, wherein the difference between the gray scales of the image in any two adjacent windows of the first image is the same.

9. The measuring method according to claim 6, wherein in the first image, the window disposed in the central area is a rectangular structure, and all the other windows except the window disposed in the central area are of a frame structure.

10. The measuring method according to claim 9, wherein a transverse direction of the rectangular structure is a first direction; a lengthwise direction of the rectangular structure is a second direction; and a minimum distance between an outer frame edge and an inner frame edge of each window with the frame structure in the first image along the first direction is all the same, and a minimum distance along the second direction is all the same; or a minimum number of pixels between the outer frame edge and the inner frame edge of each window with the frame structure in the first image along the first direction is all the same, and a minimum number of pixels along the second direction is all the same.

11. The measuring method according to claim 10, wherein the window with the rectangular structure in the first image has a width of $W_1/N_1$, and a length of $L_1/N_1$; and the minimum distance between the outer frame edge and the inner frame edge of each window with the frame structure in the first image along the first direction is all $W_1/2N_1$, and the minimum distance along the second direction is all $L_1/2N_1$, wherein $W_1$ refers to a width of the first image; $L_1$ refers to a length of the first image; $N_1$ refers to a number of the windows in the first image; and $N_1 \geq 2$; or the number of pixels of the window with the rectangular structure in the first image along the first direction is $V_1/N_1$, and the number of pixels along the second direction is $H_1/N_1$; and the minimum number of pixels between the outer frame edge and the inner frame edge of each window with the frame structure in the first image along the first direction is all $V_1/2N$, and the minimum number of pixels along the second direction is all $H_1/2N_1$, wherein $V_1$ refers to a number of pixels of the first image in the first direction; $H_1$ refers to a number of pixels of the first image in the second direction; $N_1$ refers to the number of the windows in the first image; and $N_1 \geq 2$.

12. The measuring method according to claim 6, wherein in the first image, the window disposed in the central area is a circular structure, and all the other windows except the window disposed in the central area are of a ring structure; or in the first image, the window disposed in the central area is an elliptical structure, and all the other windows except the window disposed in the central area are of an elliptical ring structure.

13. The measuring method according to claim 1, wherein the display device has a single channel of n bit, and an APL of the second image has a range of $[(2^n-1)/2, 2^n-1)$, wherein n is a positive integer.

14. The measuring method according to claim 13, wherein the range of the APL of the second image is $[2^{n-1}+2^{n-3}, 2^{n-1}+2^{n-2}]$.

15. The measuring method according to claim 1, wherein, in the second image, each area at least includes one local dimming subunit.

16. The measuring method according to claim 1, wherein the second image is an image with gray scales increased progressively from its central area to its edge.

17. The measuring method according to claim 1, wherein a number of the areas with different gray scales in the first image and a number of the areas with different gray scales in the second image are the same.

18. The measuring method according to claim 17, wherein both the number of the areas with different gray scales in the first image and the number of the areas with different gray scales in the second image are 10.

19. A measuring system for measuring contrast of a display device, comprising:

a first processing unit configured to control a display device to display a first image, measure brightness of a central area of the first image, and obtain a first brightness, wherein the first image has a plurality of areas with different gray scales; the gray scale of the central area of the first image is maximum; and the display device has a single channel of n bit, an APL of the first image has a range of $(0, (2^n-1)/2]$, wherein n is a positive integer;

a second processing unit configured to control the display device to display a second image, measure brightness of a central area of the second image, and obtain a second brightness, wherein the second image has a plurality of areas with different gray scales; the gray scale of the central area of the second image is minimum; and the single channel of the display device is n bit, an APL of the second image has a range of $[(2^n-1)/2, 2^n-1)$, wherein n is a positive integer; and a determining unit configured to determine the contrast of the display device according to the first brightness and the second brightness.

20. A measuring system, comprising:

a driver configured to control a display device to respectively display a first image and a second image, wherein the first image has a plurality of areas with different gray scales and includes a maximum gray scale area and at least one non-maximum gray scale area; a test area of the first image is disposed in the maximum gray scale area; the second image has a plurality of areas with different gray scales and includes a minimum gray scale and at least one non-minimum gray scale area; and a test area of the second image is disposed in the minimum gray scale area;

a brightness measuring device configured to respectively measure brightness of the test area of the first image and brightness of the test area of the second image; and a calculator configured to calculate the contrast according to the brightness of the test area of the first image and the brightness of the test area of the second image measured by the brightness measuring device.

* * * * *